(12) United States Patent
Kohli

(10) Patent No.: US 11,429,973 B2
(45) Date of Patent: Aug. 30, 2022

(54) SYSTEMS AND METHODS FOR AUTHENTICATING A REQUESTOR AT AN ATM

(71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 278 days.

(21) Appl. No.: 16/658,834

(22) Filed: Oct. 21, 2019

(65) Prior Publication Data

US 2020/0051083 A1    Feb. 13, 2020

Related U.S. Application Data

(63) Continuation of application No. 15/167,386, filed on May 27, 2016, now Pat. No. 10,453,060.

(51) Int. Cl.
*G06Q 20/40* (2012.01)
*G07F 19/00* (2006.01)
(Continued)

(52) U.S. Cl.
CPC ... *G06Q 20/40145* (2013.01); *G06Q 20/1085* (2013.01); *G06Q 20/326* (2020.05);
(Continued)

(58) Field of Classification Search
None
See application file for complete search history.

(56) References Cited

U.S. PATENT DOCUMENTS

| 7,828,646 B2 | 11/2010 | Franks, Jr. |
| 8,959,029 B2 | 2/2015 | Jones et al. |

(Continued)

FOREIGN PATENT DOCUMENTS

| CN | 105229596 A | 1/2016 |
| CN | 105580046 A | 5/2016 |

(Continued)

OTHER PUBLICATIONS

European Summons to Oral Proceeding, Application No. 17720986.3, dated Mar. 24, 2021, 8 pps.

(Continued)

*Primary Examiner* — Jason Borlinghaus
(74) *Attorney, Agent, or Firm* — Armstrong Teasdale LLP

(57) ABSTRACT

An authentication computing device including at least one processor in communication with a memory is provided. The processor stores, within the memory, an authentication profile associated with an account holder. The authentication profile includes an account identifier associated with a payment account of the account holder and authentication information. The processor further receives an authentication request associated with the payment account and a payment card action request from a requestor for a payment card action to be performed through an automated teller machine (ATM). The processor also retrieves the stored authentication profile, generates an authentication challenge based on the authentication profile, transmits the authentication challenge to a client device and/or the ATM, receives an authentication response from the requestor, and determines an authentication result based, at least in part, on the authentication response. The authentication result indicates if the requestor is the authenticated account holder of the payment account.

20 Claims, 7 Drawing Sheets

(51) Int. Cl.
  *G06Q 20/34* (2012.01)
  *G06Q 20/32* (2012.01)
  *G06Q 20/10* (2012.01)
  *H04L 9/40* (2022.01)

(52) U.S. Cl.
  CPC ......... *G06Q 20/34* (2013.01); *G06Q 20/4014* (2013.01); *G07F 19/20* (2013.01); *H04L 63/0838* (2013.01)

(56) References Cited

U.S. PATENT DOCUMENTS

| | | |
|---|---|---|
| 2002/0112170 A1 | 8/2002 | Foley et al. |
| 2003/0120934 A1 | 6/2003 | Ortiz |
| 2006/0123465 A1 | 6/2006 | Ziegler |
| 2008/0046366 A1 | 2/2008 | Bemmel et al. |
| 2008/0116259 A1 | 5/2008 | Oberan |
| 2009/0078756 A1 | 3/2009 | Oberan |
| 2009/0320106 A1 | 12/2009 | Jones et al. |
| 2011/0202466 A1 | 8/2011 | Carter |
| 2014/0156536 A1 | 6/2014 | Grigg et al. |
| 2014/0245391 A1 | 8/2014 | Adenuga |
| 2014/0289116 A1 | 9/2014 | Polivanyi |
| 2014/0337221 A1 | 11/2014 | Hoyos |
| 2015/0161375 A1 | 6/2015 | Ghosh et al. |
| 2015/0287017 A1 | 10/2015 | Iqbal et al. |
| 2015/0317637 A1 | 11/2015 | Kuribara et al. |

FOREIGN PATENT DOCUMENTS

| | | |
|---|---|---|
| EP | 1898349 A1 | 3/2008 |
| WO | 9600485 A2 | 1/1996 |
| WO | 2005057510 A1 | 6/2005 |
| WO | 2015002608 A1 | 1/2015 |

OTHER PUBLICATIONS

China First Office Action, Application No. 201780032680.7, dated Mar. 29, 2021, 13 pps.
PCT International Search Report and Written Opinion, Application No. PCT/US2017/028803, dated Jun. 30, 2017, 11 pps.

SYSTEMS AND METHODS FOR AUTHENTICATING A REQUESTOR AT AN ATM

CROSS REFERENCE TO RELATED APPLICATIONS

This application is a continuation of U.S. patent application Ser. No. 15/167,386 filed on May 27, 2016, entitled "SYSTEMS AND METHODS FOR AUTHENTICATING A REQUESTOR AT AN ATM", which is hereby incorporated by reference in its entirety.

BACKGROUND

The field of the disclosure relates generally to authenticating requestors for payment card accounts, and more specifically, authenticating requestors to perform payment card actions through automatic teller machines (ATMs).

At least some known automatic teller machines (ATMs) enable cardholders and other users (referred to herein as "requestors") to purchase a prepaid payment card. These prepaid cards may be used like debit cards to make purchases with merchants up to the amount associated with the prepaid cards. The use of a prepaid card instead of other methods of payment may be beneficial in some cases such as for gifts and travel. The prepaid card may be gifted to another person to make purchases. In another example, the prepaid card may be used during travel to a foreign country to make purchases without converting any currency. In addition, using the prepaid card may prevent payment card fraud of the requestor's other payment cards (e.g., credit or debit cards) while in the foreign country.

Moreover, at least some known ATMs enable a cardholder to receive other payment cards (e.g., credit and debit cards) in real-time or substantially real-time without visiting an issuer (e.g., a bank) or receiving the payment cards via mail delivery. In other words, these known ATMs will generate a payment card and eject the generated payment card from the ATM to the cardholder while the cardholder is visiting the ATM. Typically, these known ATMs generate white label or non-personalized payment cards. The ATM may be providing the cardholder with a new payment card (i.e., for a new account), an updated payment card (i.e., for expired payment cards), and/or a replacement payment card (i.e., the original payment card was lost or stolen). However, these known ATMs are not configured to authenticate the requestor when generating and providing a payment card. For example, if the requestor provides a check or cash in exchange for a prepaid card, the ATMs are not configured to authenticate the purchase. In other known ATMs, the authentication process used may be long and frustrating for requestors, which may potentially lead to reduced purchases of prepaid cards.

BRIEF DESCRIPTION

In one aspect, an authentication computing device including at least one processor in communication with a memory is provided. The processor stores, within the memory, an authentication profile associated with an account holder. The authentication profile includes an account identifier associated with a payment account of the account holder and authentication information. The processor further receives an authentication request associated with the payment account and a payment card action request from a requestor for a payment card action to be performed through an automated teller machine (ATM). The processor also retrieves the stored authentication profile, generates an authentication challenge based on the authentication profile, transmits the authentication challenge to a client device and/or the ATM, receives an authentication response from the requestor, and determines an authentication result based, at least in part, on the authentication response. The authentication result indicates if the requestor is the authenticated account holder of the payment account.

In another aspect, a method for authenticating a requestor for a payment action request using an authentication system is provided. The method is, at least partially, implemented by an authentication computing device. The method includes storing, within a memory, an authentication profile associated with an account holder, the authentication profile including an account identifier associated with a payment account of the account holder and authentication information associated with the account holder. The method also includes receiving an authentication request associated with the payment account of the account holder and with a payment card action request from a requestor for a payment card action to be performed through an ATM, retrieving the stored authentication profile for the payment account, generating an authentication challenge based on the stored authentication profile, transmitting the authentication challenge to at least one of a client device and the ATM, receiving an authentication response from the requestor, and determining an authentication result based, at least in part, on the authentication response. The authentication result indicates if the requestor is the authenticated account holder of the payment account.

In yet another aspect, a non-transitory computer-readable storage media for authenticating a requestor for a payment action request through an ATM using an authentication system is provided. The computer-readable storage media has computer-executable instructions embodied thereon. When executed by at least one processor, the computer-executable instructions cause the processor to store, within a memory, an authentication profile associated with an account holder, the authentication profile including an account identifier associated with a payment account of the account holder and authentication information associated with the account holder. The computer-executable instructions further cause the processor to receive an authentication request associated with the payment account of the account holder and with a payment card action request from a requestor for a payment card action to be performed through the ATM, retrieve the stored authentication profile for the payment account, generate an authentication challenge based on the stored authentication profile, transmit the authentication challenge to at least one of a client device and the ATM, receive an authentication response from the requestor, and determine an authentication result based, at least in part, on the authentication response. The authentication result indicates if the requestor is the authenticated account holder of the payment account.

DETAILED DESCRIPTION

Figure 1:
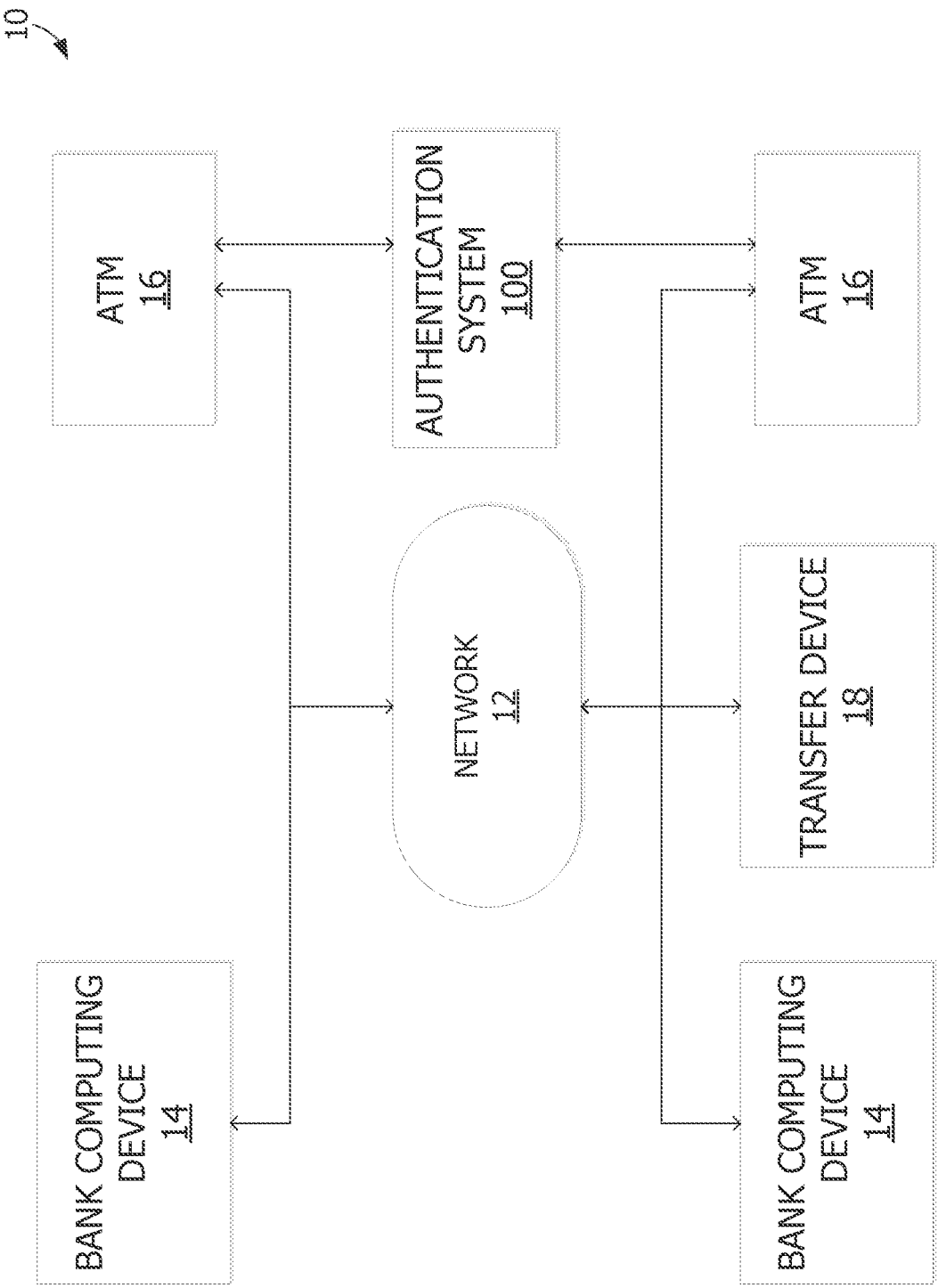
FIG. 1 is a block diagram of an example authentication platform for authenticating requestors before performing payment card actions.

The system described herein is configured to authenticate a requestor's identity for performing a payment card action at an automated teller machine (ATM) using authentication information from a registered account holder and the requestor. In particular, the system is configured to provide a requestor with an authentication challenge in response to a request to perform a payment card action (e.g., receive a payment card, unblock a payment card, etc.) to authenticate the requestor. The system includes an authentication computing device including a processor and a memory. In the example embodiment, the authentication computing device is associated with, in communication with, and/or integral to an electronic funds transfer (EFT) network configured to process requests initiated by requestors using an ATM.

During at least some requests, at least one party receiving the request initiates an authentication process. The authentication process is designed to prevent fraudulent requests by authenticating the identity of the requestor. Various authentication processes may be performed by various parties. For example, the party that initiates the authentication may contract with another party that provides the authentication service (which may be, for example, one of a merchant bank or an issuer, or may be the EFT network, or may be another third party). Upon authentication of the cardholder's identity, the authentication service provides an indication of authentication (sometimes with a score or level of confidence) to the authentication-initiating party. The request may then be resumed and transmitted for an authorization process. The payment processor collects request data associated with these requests (e.g., authentication and/or authorization) for further processing.

In the example embodiment, the authentication computing device is associated with an authentication service. As described above, the authentication service may be provided to merchants, merchant banks, and/or issuer banks by the EFT network and/or by another third party. The authentication computing device is further in communication with one or more ATM computing devices. Each ATM computing device is part of an ATM and may be associated with a merchant, a bank, an issuer, and/or another third party providing financial services at the ATM. In one embodiment, the authentication computing device may store, receive, retrieve, and/or otherwise access a lookup table that includes the ATM computing devices, wherein the lookup table indicates whether or not each of the ATM computing devices is associated with an automated payment card service.

At least one ATM computing device is configured to provide an automated payment card service. In particular, the ATM computing device is configured to enable a requestor to perform payment card actions at the ATM, such as request a payment card from the ATM. At least some payment cards may be purchased through the ATM computing device. For example, prepaid cards may be purchased and activated through the ATM computing device. The prepaid card is associated with an account stored at the ATM computing device (or another computing device associated with the ATM computing device) that includes an amount based on the payment made by the requestor. Additionally or alternatively, the payment card actions may include reissuing payment cards, renewing expired payment cards, and unblocking payment cards. That is, the ATM computing device and the authentication computing device are configured to enable cardholders to perform these payment card actions that typically require the cardholders to contact or visit an issuer (e.g., a bank) at an ATM.

To purchase a prepaid card or receive another payment card, the requestor registers with the authentication service. In one embodiment, the ATM computing device begins an enrollment process by prompting the requestor to provide registration information. The registration information may include, but is not limited to, a username, a name, an age, an address, and a bank identifier of the requestor. In another embodiment, the requestor may register via an app or web service at a client device associated with the requestor. The client device may include a smartphone, a laptop, a desktop, a tablet, a wearable device, a smartwatch, and/or another type of computing device. When registering, the requestor is prompted to input authentication information that uniquely identifies the requestor. In the example embodiment, the authentication information is biometric information, such as a fingerprint or image of the requestor. The ATM computing device and/or the client device includes at least one component for collecting authentication information from the requestor, such as a fingerprint scanner, a touchscreen, a microphone, and/or a camera. In some embodiments, the authentication information may be retrieved from or linked from a user information database that stores authentication information, such as a database of national identifications (IDs). Additionally or alternatively, the requestor may be prompted to provide other authentication information, such as a password or other unique identifier.

Based on the registration information and/or the authentication information, a registration profile may be created for the requestor and stored in a memory associated with the authentication computing device. In some embodiments, the registration profile may be linked to an existing user account of the requestor with a financial institution (e.g., an online account with a bank). When the requestor subsequently requests to perform a payment card action, the ATM computing device or the client device prompts the requestor to input user credentials such as a username or other information that may identify the requestor. Alternatively, the ATM computing device or the client device may prompt the requestor for user credentials before submitting the request. The user credentials may be associated with the requestor's user account with the financial institution. The ATM computing device or the client device may determine that the user credentials are associated with a requestor enrolled in the authentication service. The ATM computing device or the client device generates an authentication request with the user credentials and transmits the authentication request to the authentication computing device.

The authentication computing device is configured to identify a stored registration profile that is associated with the authentication request (e.g., based on the user credentials of the authentication request). The identified registration profile is retrieved for authentication. In some embodiments, the authentication computing device generates an authentication challenge and transmits the authentication challenge to the ATM computing device and/or the client device for authentication. The authentication challenge is based on the authentication information associated with the identified registration profile. For example, if the requestor provided a fingerprint during registration for the authentication service, the authentication challenge prompts the requestor to provide a similar fingerprint for comparison as described below. The authentication information may be stored with the identified registration profile and/or in a different memory, such as the national ID database. In other embodiments, another computing device such as a biometric authentication server or a computing device associated with the national ID database may generate the authentication challenge.

Once the ATM computing device and/or the client device receive the authentication challenge, the requestor is prompted to respond. In certain embodiments, the requestor may be given a time limit to respond to the biometric challenge. If the time limit is exceeded, the request to perform the payment card action may be automatically declined. Once the ATM computing device or the client device collects authentication information from the requestor, the ATM computing device or the client device transmits an authentication response including the collected authentication information to the authentication computing device to be used in an authentication process. Additionally or alternatively, a different computing device associated with the authentication challenge (e.g., the biometric authentication server) may receive the authentication response to perform the authentication process.

In some embodiments, when the client device receives the authentication challenge, the client device may be configured to provide location data (e.g., coordinates) to the authentication computing device and/or the ATM computing device to determine a location of the account holder relative to the ATM. The location information may be provided with the authentication response. For example, the authentication computing device may request Global Positioning System (GPS) coordinates from the client device. When the authentication computing device receives the location data of the client device, the authentication computing device retrieves location data associated with the ATM used by the requestor to initiate that payment card action request. The location data may be retrieved, for example, from the ATM computing device or from the memory of the authentication computing device. Alternatively, the authentication computing device may receive the location data of the ATM before retrieving the location data of the client device. The authentication computing device compares the location of the client device to the locations of the ATM to determine whether or not the account holder is present at the ATM. Alternatively, the client device may communicate with the ATM computing device to determine a relative location of the account holder to the ATM. If the account holder is within a predefined radius of an ATM, the payment card action request may be more likely to be initiated by the authentic cardholder than a fraudulent requestor. Conversely, if the client device is not present at the ATM, the request may be fraudulent. In certain embodiments, the authentication result is based in part of the comparison of the location data.

The collected authentication information is compared to stored authentication information associated with the registration profile of the requestor. If the collected authentication information is substantially similar (e.g., there is a match) to the stored authentication information, the authentication computing device may determine that the requestor is authenticated. Otherwise, if the collected authentication information is not substantially similar (e.g., no match) to the stored authentication information, the authentication computing device may determine that the requestor is not authenticated ("declined"). The authentication computing device may generate an authentication value for each set of authentication information and compare the authentication values to authenticate the requestor. For example, if a difference between the authentication values is within a predetermined threshold, the authentication computing device may determine that the requestor is authenticated.

In the example embodiment, the ATM computing device receives a result (also referred to as an "authentication result") of the authentication process from the authentication computing device. In another embodiment, the requestor's client device transmits the authentication request and receives the result from the authentication computing device. The client device, upon receiving the authentication result, transmits the authentication result to the ATM computing device while the requestor is located near the ATM computing device via near-field communication (NFC), Bluetooth, or another form of communication. The authentication result indicates whether or not the requestor was authenticated or declined during the authentication process. In some embodiments, the result may include a confidence score that indicates the confidence of the authentication computing device that the authentic cardholder is requesting to perform the payment card action at the ATM. If the requestor is authenticated, the ATM computing device may proceed with processing the request to perform the payment card action. In some embodiments, the authentication computing device or the client device may transmit a token or other unique identifier to the ATM computing device to indicate that the requestor has been authenticated.

For example, if a prepaid card was requested, the ATM computing device may be configured to create a prepaid account associated with the requestor and the prepaid card. The ATM computing device is configured to receive cash, check, a payment card, payment information from a digital wallet, and/or another method of payment to add money to the prepaid account. The ATM computing device writes account information of the prepaid account to a physical card stored in the ATM and dispenses the card to the requestor such that the card may be used to conduct financial transactions with merchants using the money associated with the prepaid account.

In another example, if a new, updated, or replacement payment card was requested, the ATM computing device may be configured to update the existing user account of the requestor with the payment card information. More specifically, the ATM computing device may update or remove payment card information from the user account that is associated an expired, lost, or stolen payment card. Similar to the prepaid card, the ATM computing device writes account information to a physical card stored in the ATM and dispenses the card to the requestor.

Once the card has been dispensed, the ATM computing device may automatically log the requestor out after a predetermined period of time. In some embodiments, the ATM computing device may transmit a notification to the client device to provide information about the prepaid card and the authentication result. The notification may be an email, a text message, a phone call, a multimedia message, an app notification, and/or a different type of notification. In other embodiments, the ATM computing device is configured to display the notification.

The systems and methods described herein are configured to facilitate (a) secure payment card actions at ATMs; (b) performing payment card actions without requiring a cardholder to contact or visit an issuer; (c) reduce the amount of time to process payment card actions; and (d) reduced number of payment card actions manually processed by a financial institution.

The technical effects of the systems and methods described herein can be achieved by performing at least one of the following steps: (i) storing, within a memory, an authentication profile associated with an account holder, the authentication profile including an account identifier associated with a payment account of the account holder and authentication information associated with the account holder; (ii) receiving an authentication request associated with the payment account of the account holder, the authentication request associated with a payment card action request from a requestor for a payment card action to be performed through an ATM; (iii) retrieving the stored authentication profile for the payment account; (iv) transmitting the authentication challenge to at least one of a client device and the ATM; (v) generating an authentication challenge based on the stored registration profile; (vi) receiving an authentication response from the requestor; and (vii) determining an authentication result based, at least in part, on the authentication response, the authentication result indicates if the requestor is the authentic account holder of the payment account.

The following detailed description of the embodiments of the disclosure refers to the accompanying drawings. The same reference numbers in different drawings may identify the same or similar elements. Also, the following detailed description does not limit the claims.

Described herein are computer systems such as the authentication computing device, client devices, and ATM computing devices. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the determination and analysis of characteristics of devices used in payment transactions.

FIG. 1 is a schematic diagram illustrating an example authentication platform 10 that includes a funds transfer network 12 for performing financial transactions and other financial account actions between payment accounts. In the example embodiment, authentication platform 10 is configured to authenticate a user or requestor before performing a payment card action (e.g., generating a new payment card, activating a payment card, etc.). Network 12 may be, for example, an electronic funds transfer (EFT) network. In the example embodiment, network 12 is communicatively coupled to a plurality of bank computing devices 14, a plurality of ATMs 16, and transfer devices 18. In other embodiments, network 12 may be communicatively coupled to additional, fewer, or alternative computing devices, including those described elsewhere herein.

Network 12 is configured to receive and transmit electronic messages associated with payment accounts between the computing devices. The payment accounts are generated and stored by bank computing devices 14. Bank computing devices 14 are associated with one or more financial institutions that provide payment accounts to customers, such as banks and credit unions. The payment accounts may be used to perform financial transactions with merchants through network 12 or a different network. At least some payment accounts are associated with a payment card that enables the financial transactions to be performed. Bank computing devices 14 enable account holders to perform various payment card actions using network 12. In particular, these payment card actions are actions perform for the account holder's payment account or between the payment account and a second payment account. The payment accounts may be associated with different account holders or the same account holder. For example, an account holder may transfer funds between payment accounts, open a new payment account (e.g., a prepaid account), renew payment cards, and/or unblock or activate a payment account.

In the example embodiment, bank computing devices 14 include a web interface to enable the account holders to access information associated with their payment accounts and perform at least some payment card actions. Some payment card actions, such as opening or activating a payment account, may not be available through the web interface to prevent fraudulent activity. Bank computing devices 14 may also be operated by administrative users (e.g., employees of the financial institutions) to perform payment card actions on-behalf of the account holders when the account holders visit or contact the associated financial institution. The payment card actions may not be limited when performed by the administrative users because the administrative users can physically authenticate the identity of the account holder before performing the payment card action.

In the example embodiment, ATMs 16 are communicatively coupled to bank computing devices 14 through network 12 to enable account holders to perform payment card actions. ATMs 16 include components such as a card reader, keypad, camera, and fingerprint scanner for verifying an identity of the account holder. ATMs 16 request authorization from bank computing devices 14 to conduct the payment card actions. ATMs 16 are configured to store and dispense money and payment cards for certain payment card actions. To operate ATM 16, an account holder provides a user identifier that identifies the account holder or the payment account to ATM 16. ATM 16 is configured to retrieve information associated with the payment account and prompt the account holder to select an available payment card action. After ATM 16 receives a selection and verifies the identity of the account holder, ATM 16 transmits a message to bank computing device 14 to request authorization of the action.

In one example, to withdraw money from a payment account of an account holder, the account holder presents a payment card associated with the account to a card reader of ATM 16 to identify the account holder and the payment account. After a withdrawal amount is specified, ATM 16 transmits a message to bank computing device 14 that stores the account indicating the amount and dispenses money to match the withdrawal amount in response to receiving approval from bank computing device 14.

In the example embodiment, transfer devices 18 are configured to perform payment card actions through network 12. Transfer devices 18 may not be associated with a financial institution that provides payment accounts to customers. For example, transfer device 18 may be associated with a wire transfer institution that enables customers to transfer physical funds (e.g., check, money, etc.) to a payment account within network 12 without transferring said funds from another account. Transfer device 18 may also be configured to perform payment card actions between network 12 and a different network, such as a network provided in a different country.

As described below, platform 10 includes authentication system 100. ATMs 16 are in communication with authentication system 100 that provides an authentication service to payment account holders. Account holders are given an option to register to the authentication service to enable secure payment card actions at ATMs 16. In some embodiments, the account holders may be automatically enrolled in the authentication service. Authentication system 100 is configured to receive authentication information (e.g., biometric information) associated with the account holder during registration and transmit an authentication challenge to the account holder in response to a request to perform a payment card action using the account holder's payment account. Authentication system 100 receives a challenge response from the account holder and determines an authentication result. That is, authentication system 100 is configured to authenticate or decline the request. Authentication system 100 transmits the authentication result to ATM 16 and/or bank computing device 14 to process the request.

Figure 2:
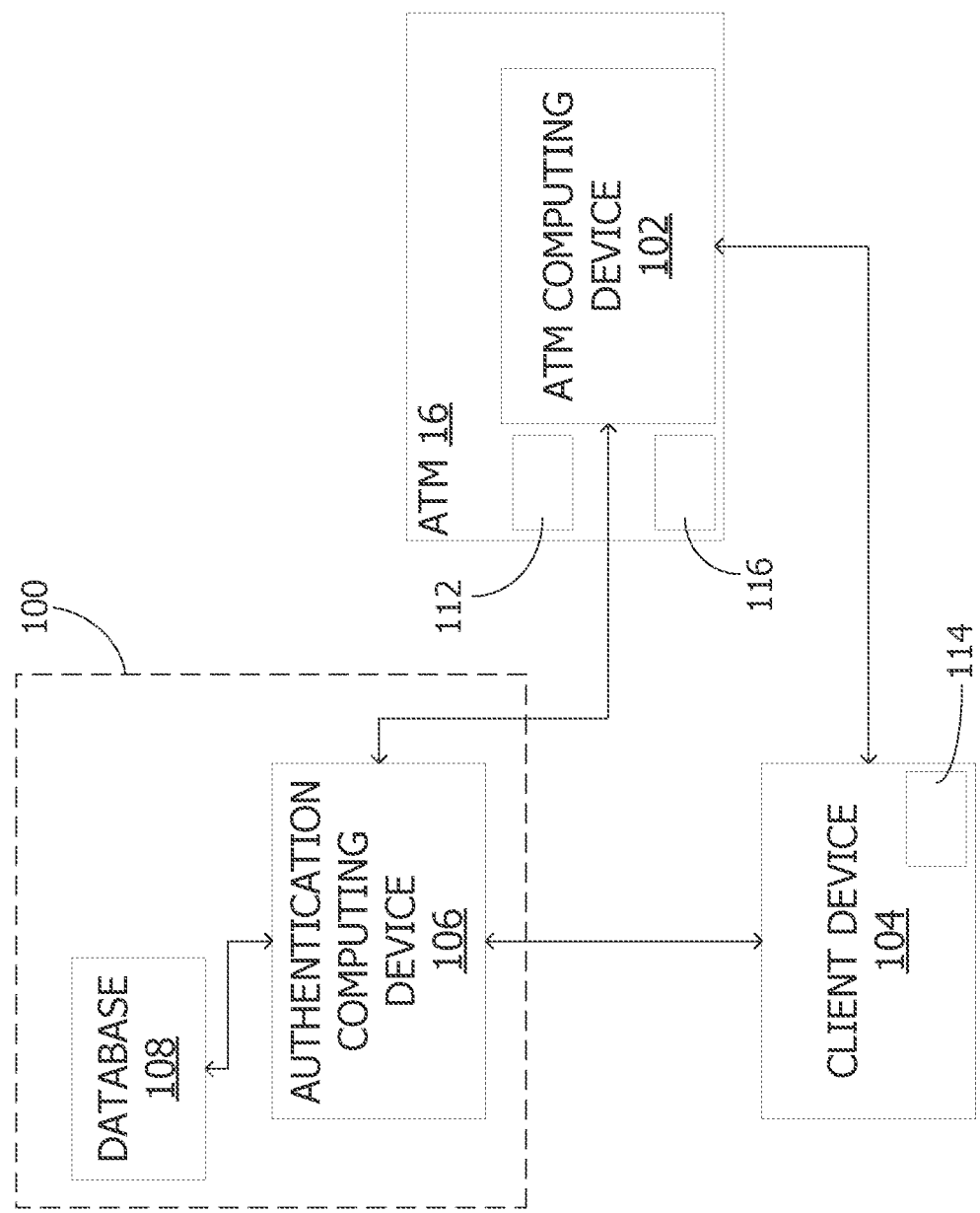
FIG. 2 is a block diagram of an example authentication system for authenticating a requestor for payment card actions at an automated teller machine (ATM) for use with the platform of FIG. 1.

FIG. 2 is a block diagram of a portion of authentication platform 10 shown in FIG. 1. More specifically, FIG. 2 is a block diagram of authentication system 100 in communication with an ATM computing device 102 of ATM 16 and a client device 104 to authenticate users for payment accounts actions at ATM 16. In the example embodiment, system 100 includes an authentication computing device 106 and a database 108. In other embodiments, system 100 may include additional, fewer, or alternative components, including those described elsewhere herein.

In the example embodiment, ATM computing device 102 is a computing device integrated with ATM 16. In other embodiments, ATM computing device 102 may be communicatively coupled to ATM 16. ATM computing device 102 is configured to communicate with client device 104 and/or authentication computing device 106 to facilitate authenticating a requestor for a payment card action. As used herein, a requestor may be an account holder or a user with permission to perform payment card actions using the payment account. In some cases, the requestor may also be a fraudulent party that is attempting to perform a fraudulent payment card action using the account holder's payment account. In the example embodiment, ATM computing device 102 is also communicatively coupled to network 12 to communicate with bank computing devices 14 (both shown in FIG. 1). In at least some embodiments, ATM computing device 102 is in communication with an authentication component 110 of ATM 16 for collecting authentication information from a requestor. The authentication component 110 may include, for example, a fingerprint scanner, a camera, a microphone, a touchscreen, or another component configured to collection authentication information.

Client device 104 is a computing device associated with the account holder. For example, client device 104 may be a smartphone, tablet, smartwatch, wearable electronic, laptop, desktop, vehicle computing device, or another type of computing device associated with the account holder. Client device 104 includes an input component 112 such as a fingerprint scanner, a camera, a microphone, a touchscreen, or another component configured to collection authentication information. Client device 104 is communicatively coupled to ATM computing device 102 and/or authentication computing device 106 to perform payment card actions and provide authentication information from the account holder.

Authentication computing device 106 is configured to provide an authentication service for the account holder to facilitate secure payment card actions at ATM 16. During registration of the account holder's payment account or at a later time, the account holder may be prompted to enroll in the authentication service. If the account holder accepts, an enrollment process begins. During the enrollment process, authentication computing device 106 receives a user identifier associated with the account holder and/or the payment account. The user identifier may include, but is not limited to, a name, an primary account number (PAN), a username, a password, and/or another unique identifier. The user identifier is used to identify which account holder and payment account is associated with an authorization request as described herein. The account holder provides a device identifier to authentication computing device 106 to link client device 104 to the enrolled payment account. In addition, authentication computing device 106 is configured to prompt the account holder to provide authentication information. In the example embodiment, the authentication information is biometric information, such as a fingerprint, image, or voiceprint. Input component 112 of client device 104 may be used to collect the biometric information. In other embodiments, the authentication information may be a different type of information, such as device information. Once the user identifier, the device identifier, and the authentication information have been received, authentication computing device 106 is configured to generate an authentication profile associated with the account holder and store the authentication profile in a memory associated with authentication computing device 106. For example, database 108 may be configured to store the authentication profile.

In some embodiments, at least some information may be automatically retrieved by authentication computing device 106 during the enrollment process. For example, at least a portion of the user identifier may be retrieved from the payment account. In another example, authentication computing device 106 is in communication with an external user information database (e.g., a national ID database) that includes authentication information of the account holder. In such an example, the authentication information may not be stored with the authentication profile, but rather is retrieved from the user information database during an authentication process as described herein.

In the example embodiment, authentication computing device 106 is configured to notify ATM computing device 106 that the payment account has been enrolled in the authentication service. ATM computing device 106 stores the notification such that ATM computing 106 is configured to identify payment accounts enrolled in the authentication service. Additionally or alternatively, authentication computing device 102 may notify a different computing device, such as bank computing device 14 (shown in FIG. 1), that the payment account has been enrolled.

In some cases, the account holder may already be enrolled in the authentication service. Authentication computing device 106 is configured to detect whether an authentication profile already exists for the account holder during the enrollment process. If the authentication profile already exists, authentication computing device 106 is configured to link the authentication profile to the account holder's payment account. In certain embodiments, the account holder may register for the authentication service without linking to a payment account. Authentication computing device 106 may be configured to push an application to client device 104 after the account holder has enrolled.

In the example embodiment, a requestor transmits a payment card action request to ATM computing device 102 to request a payment card action be performed through ATM 16. In one embodiment, the payment card action request is transmitted from client device 104. In another embodiment, the payment card action request is inputted by the requestor at ATM 16. The payment card action request includes one or more user identifiers that identify the requestor and/or an account identifier for the associated payment account. ATM computing device 102 is configured to determine if the requestor and/or the payment account is enrolled in the authentication service. In some embodiments, if the requestor and the payment account are not enrolled, ATM computing device 102 may automatically decline the request. If the requestor and the payment account are enrolled, ATM computing device 102 is configured to generate and transmit an authentication request to authentication computing device 106. The authentication request includes the user and/or account identifiers from the payment card action request. Alternatively, the authentication request may include an identifier that uniquely identifies the authentication profile of the payment account. In certain embodiments, rather than sending the payment card action request to ATM computing device 102, client device 104 may be configured to transmit the authentication request directly to authentication computing device 106.

In the example embodiment, authentication computing device 106 is configured to receive the authentication request and identify an authentication profile associated with the authentication request. Authentication computing device 106 retrieves the authentication profile to begin the authentication process. In some embodiments, if the stored authentication information from the enrollment process is not stored with the authentication profile, authentication computing device 106 may retrieve the authentication information. Authentication computing device 106 is configured to generate an authentication challenge and transmit said challenge to ATM computing device 102 and/or client device 104. The authentication challenge is configured to prompt the requestor to provide similar authentication information as the stored authentication information form the enrollment process. For example, if a thumbprint was provided during the enrollment process, the authentication challenge may request a thumbprint from the same thumb. In certain embodiments, ATM computing device 102 may transmit the authentication challenge to client device 104. If client device 104 receives the authentication challenge, the user of client device 104 (e.g., the payment account holder) may have the option to report the payment card action request as potentially fraudulent if the user is not the requestor.

ATM computing device 102 and/or client device 104 are configured to prompt the requestor to provide authentication information. Authentication component 110 and input component 112 are configured to collect the authentication information from the requestor. Alternatively, if the authentication challenge is requesting device authentication information, ATM computing device 102 or client device 104 may automatically retrieve, calculate, or otherwise provide the authentication information. ATM computing device 102 and/or client device 104 are configured to generate a challenge response including the collected authentication information and transmit the challenge response to authentication computing device 106 for comparison.

In some embodiments, when client device 104 receives the authentication challenge, client device 104 may be configured to provide location data (e.g., coordinates, address, etc.) to authentication computing device 106 and/or ATM computing device 102 to determine a location of the account holder relative to ATM 16. The location information may be provided with the authentication response. For example, authentication computing device 106 may request Global Positioning System (GPS) coordinates from client device 104. When authentication computing device 106 receives the location data of client device 104, authentication computing device 106 retrieves location data associated with ATM 16 used by the requestor to initiate that payment card action request. The location data may be retrieved, for example, from ATM computing device 102 or from the memory of authentication computing device 102. Alternatively, authentication computing device 102 may receive the location data of ATM 16 before retrieving the location data of client device 104. Authentication computing device 106 compares the location of client device 104 to the location of ATM 16 to determine whether or not the account holder is present at ATM 16. In some embodiments, client device 104 may communicate with ATM 16 to determine a relative distance between client device 104 and the ATMs. If the account holder is within a predetermined radius of ATM 16, the payment card action request may be more likely to be initiated by the authentic cardholder than a fraudulent requestor. In certain embodiments, the authentication result is based in part of the location data of the account holder and ATM 16.

Authentication computing device 106 receives the challenge response and parses the collected authentication information from the response. Authentication computing device 106 is configured to compare the collected authentication information to the stored authentication information from the enrollment process. The comparison may be performed using any suitable technique for the type of authentication information (e.g., biometric, device, etc.). Authentication computing device 106 is configured to determine whether or not to authenticate the requestor based on the comparison. More specifically, if the collected authentication information substantially matches the stored authentication information, authentication computing device 106 may authenticate the requestor. In some embodiments, authentication computing device 106 may calculate an authentication value from the comparison that measures how much the collected and stored authentication information match or differ. If the authentication value passes a predetermined threshold value, authentication computing device 106 may authenticate the requestor.

Once the requestor's identity has been authenticated or denied, authentication computing device 106 transmits an authentication result to ATM computing device 102 and/or client device 104. In some embodiments, authentication computing device 106 may transmit the authentication result to a different computing device, such as bank computing device 14. The authentication result indicates whether or not the request has been authenticated. The authentication result may include the authentication value to enable ATM computing device 102 or bank computing device 14 to determine whether the payment card action request should be authorized. In some embodiments, the authentication result may include an action identifier that indicates what payment card action was requested, when the request was submitted, and whether or not the requestor was authenticated. The action identifier may be used, for example, when requesting to perform the payment card action through client device 104 while remote from ATM computing device 102. Client device 104 transmits the action identifier to ATM computing device 102 to perform the payment card action.

In other embodiments, authentication computing device 106 may transmit the stored authentication information with the authentication challenge in response to the authentication request to ATM computing device 102 and/or client device 104. In such embodiments, ATM computing device 102 and/or client device 104 are configured to collect the authentication information from the requestor and compare the collected authentication information to the stored authentication information to authenticate the requestor. Authentication computing device 106 may receive the authentication result In the example embodiment, if the authentication result indicates the requestor is authenticated, ATM computing device 102 determines if the requestor and/or the payment account is eligible to perform the requested payment card action. For example, if the requestor is requesting a prepaid card using funds transferred from an existing payment account of the requestor, ATM computing device 102 determines if the existing payment account has sufficient funds. If the requestor and the payment account is eligible, ATM computing device 102 and/or ATM 16 are configured to perform the payment card action.

In one example, ATM computing device 102 transmits a message through network 12 to an associated bank computing device 14 to perform the payment card action. In another example, ATM 16 includes a dispensing mechanism 116 that is configured to store a plurality of unregistered payment cards. These payment cards may include, for example, credit cards, debit cards, or prepaid cards. If the requestor is requesting a new payment card, dispensing mechanism 116 is configured to write or add payment account information to one of the unregistered payment cards and dispense the payment card for the requestor. Dispensing mechanism 116 may physically add payment account information to the payment card (e.g., adding the PAN, cardholder name, magnetic strip data, etc.) in addition to linking the payment card to the payment account. In the example embodiment, dispensing mechanism 116 is configured to generate personalized payment cards for the requestor by adding personalization elements (e.g., logo, background, text format, etc.) to the cards. For example, if the requestor is attempting to renew an expired payment card, dispensing mechanism 116 may add the same logo, background, and other details of the expired card to the newly generated card. In some embodiments, the personalization elements associated with the requestor are stored in a database, such as database 108. ATM computing device 102 is configured to notify the associated bank computing device 14 that a new payment card has been dispensed.

Figure 3:
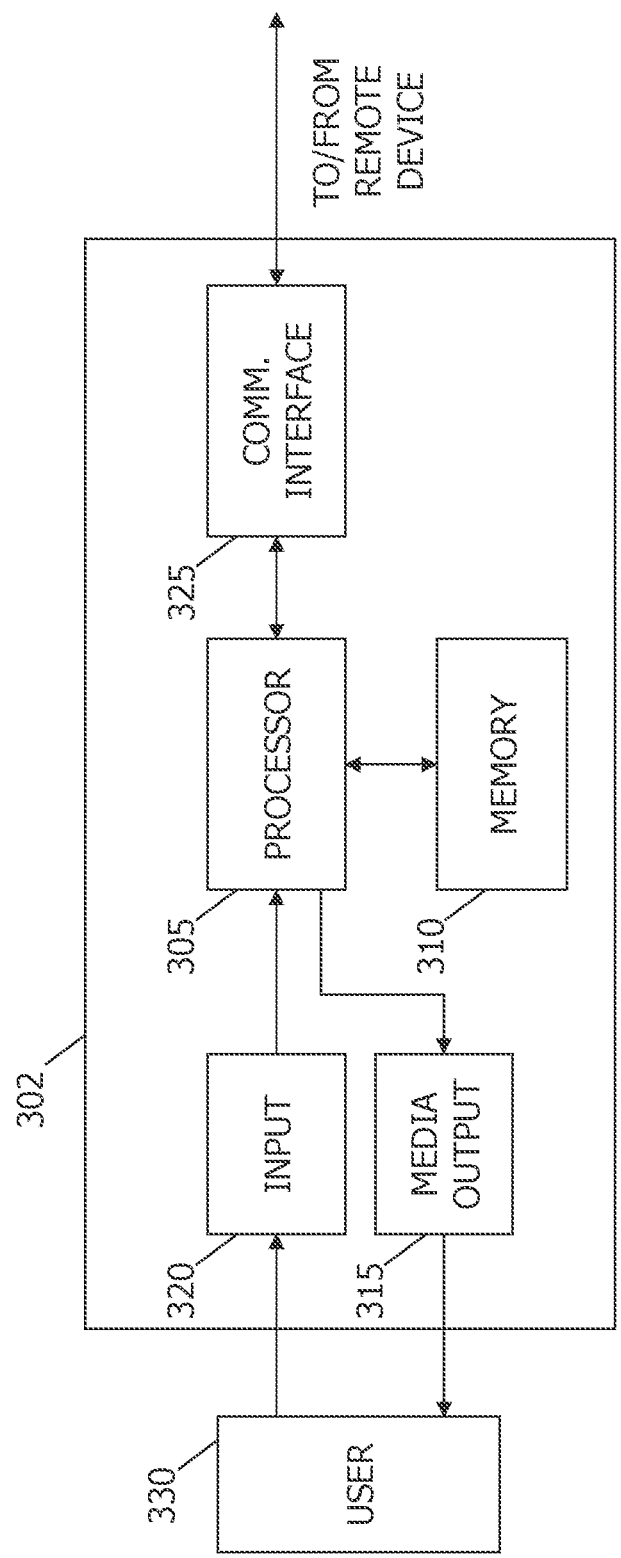
FIG. 3 illustrates an example configuration of a remote computing device used to authenticate a requestor for use with the authentication system shown in FIG. 2.

FIG. 3 depicts an exemplary configuration of a user or remote computing device 302. Computing device 302 may include ATM computing device 102 and client device 104 (both shown in FIG. 2). Computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer-readable media.

Computing device 302 may also include at least one media output component 315 for presenting information to a user 330. Media output component 315 may be any component capable of conveying information to user 330. In some embodiments, media output component 315 may include an output adapter, such as a video adapter and/or an audio adapter. An output adapter may be operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 315 may be configured to present an interactive user interface (e.g., a web browser or client application) to user 330.

In some embodiments, computing device 302 may include an input device 320 for receiving input from user 330. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320.

Computing device 302 may also include a communication interface 325, which may be communicatively coupleable to a remote device such as authentication computing device 106 (shown in FIG. 2). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 330 via media output component 315 and, optionally, receiving and processing input from input device 320. A user interface may include, among other possibilities, a web browser and client application. Web browsers enable users 330 to display and interact with media and other information typically embedded on a web page or a website from a web server associated with a merchant. A client application allows users 330 to interact with a server application associated with, for example, a vendor or business.

Figure 4:
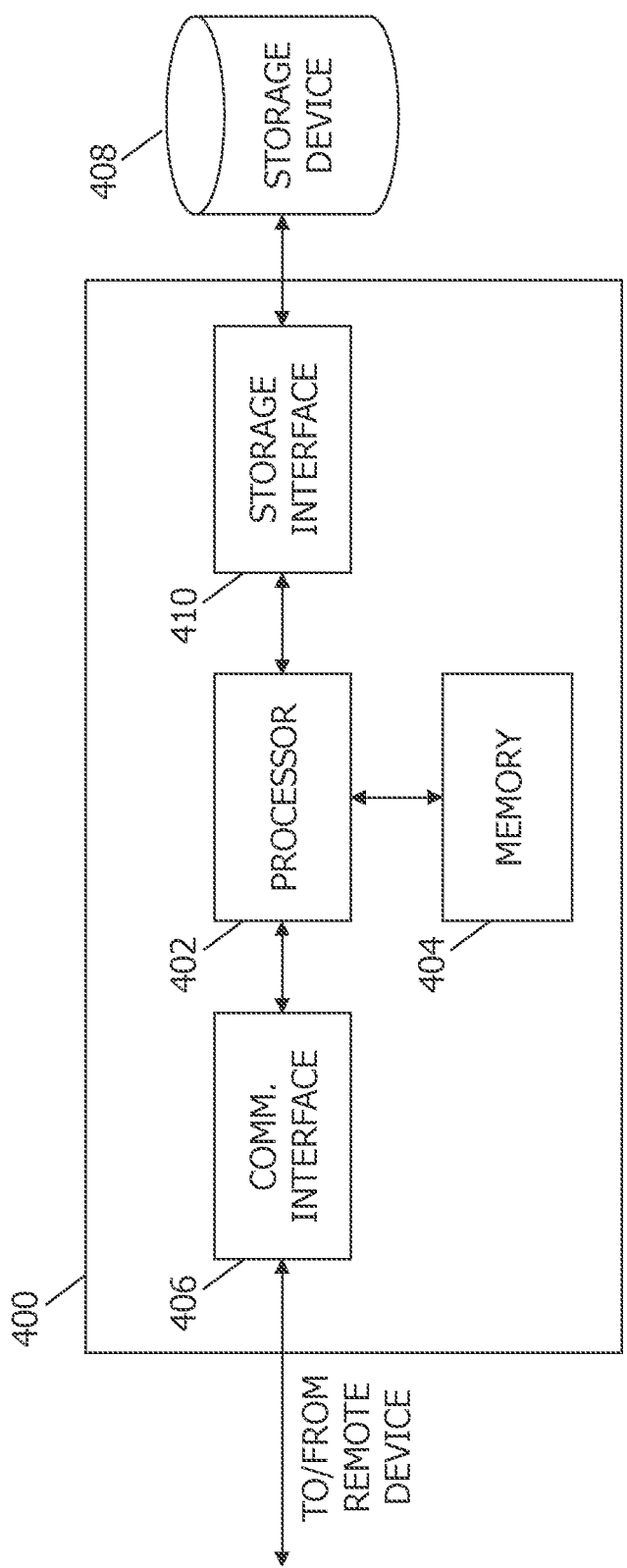
FIG. 4 illustrates an example configuration of a host system for use with the authentication system shown in FIG. 2.

FIG. 4 depicts an exemplary configuration of a host computing device 402. Host computing device 402 may include, but is not limited to, bank computing devices 14, transfer device 18, ATM computing device 102, client device 104, and authentication computing device 106 (shown in FIGS. 1 and 2). Host computing device 402 may include a processor 404 for executing instructions. Instructions may be stored in a memory area 406, for example. Processor 404 may include one or more processing units (e.g., in a multi-core configuration).

Processor 404 may be operatively coupled to a communication interface 408 such that host computing device 402 may be capable of communicating with a remote device such as computing device 302 shown in FIG. 3 or another host computing device 402. For example, communication interface 408 may receive requests from user computing device 302 via the Internet.

Processor 404 may also be operatively coupled to a storage device 410. Storage device 410 may be any computer-operated hardware suitable for storing and/or retrieving data. In some embodiments, storage device 410 may be integrated in host computing device 402. For example, host computing device 402 may include one or more hard disk drives as storage device 410. In other embodiments, storage device 410 may be external to host computing device 402 and may be accessed by a plurality of host computing devices 402. For example, storage device 410 may include multiple storage units such as hard disks or solid state disks in a redundant array of inexpensive disks (RAID) configuration. Storage device 410 may include a storage area network (SAN) and/or a network attached storage (NAS) system.

In some embodiments, processor 404 may be operatively coupled to storage device 410 via a storage interface 412. Storage interface 412 may be any component capable of providing processor 404 with access to storage device 410. Storage interface 412 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Memory areas 310 (shown in FIGS. 3) and 406 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 5:
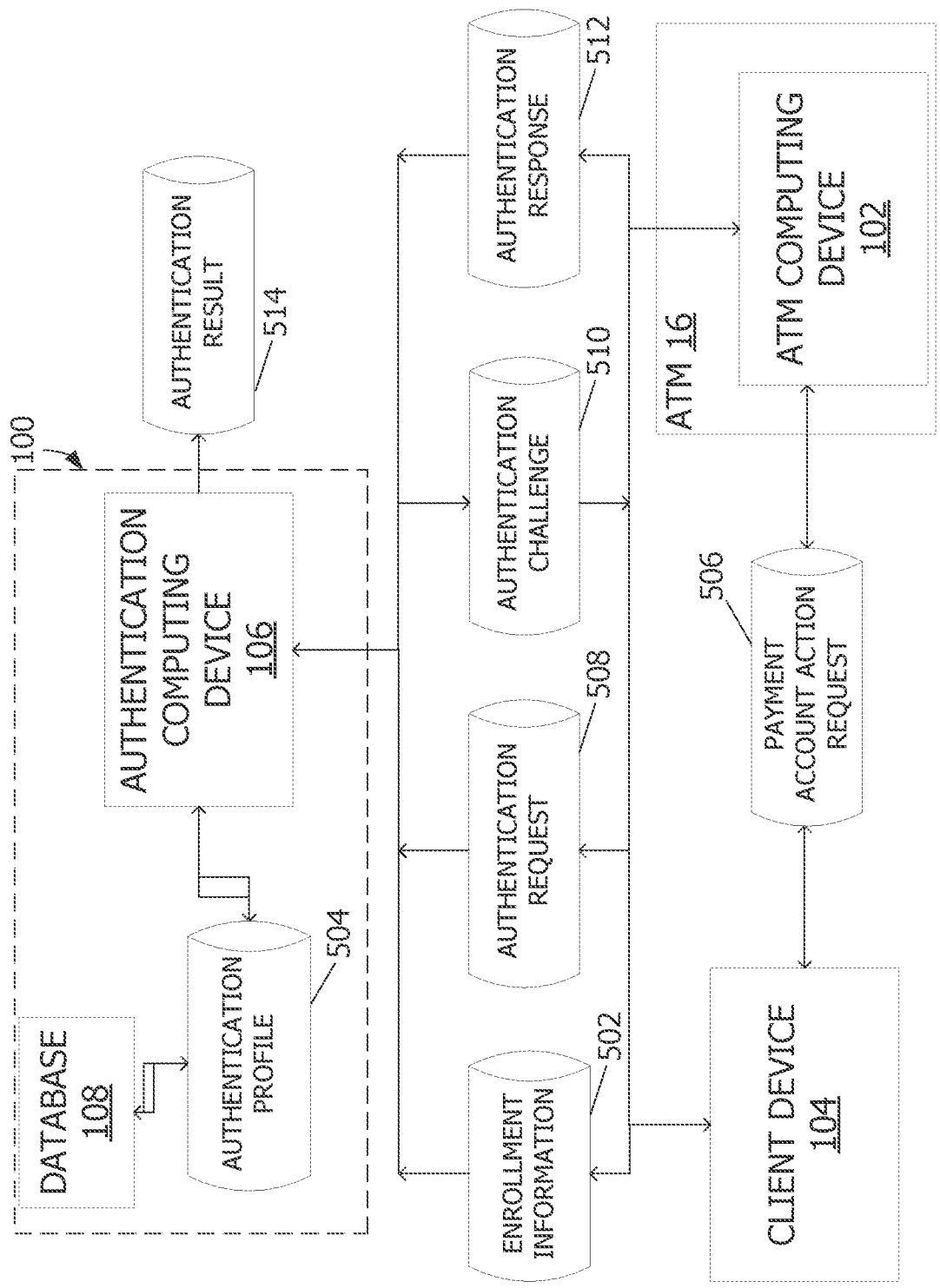
FIG. 5 is a data flow diagram of the authentication system shown in FIG. 2.

FIG. 5 is a data flow diagram of authentication system 100 (shown in FIG. 2). More specifically, FIG. 5 depicts enrollment information 502, an authentication profile 504, a payment card action request 506, an authentication request 508, an authentication challenge 510, an authentication response 512, and an authentication result 514.

In the example embodiment, during an enrollment process for an authentication service provided by authentication computing device 106, client device 104 transmits enrollment information 502 associated with an account holder to authentication computing device 106. In other embodiments, another computing device (including those not shown) may transmit enrollment information 502 to authentication computing device 106. Enrollment information 502 includes an account identifier and authentication information. In some embodiments, enrollment information 502 may include a user identifier, a device identifier, and other information provided during the enrollment process.

Based on enrollment information 502, authentication computing device 106 is configured to generate authentication profile 504. In certain embodiments, authentication profile 504 may be linked to authentication information stored in an external user information database (not shown). Authentication profile 504 is associated with the account holder and a payment account of the account holder. Authentication profile 504 may be generated before enrolling the payment account in the authentication service. In such embodiments, authentication profile 504 may be linked to the account holder and/or the payment account. In the example embodiment, authentication profile 504 is stored in database 108 for subsequent retrieval.

In the example embodiment, a requestor submits payment card action request 506 to ATM computing device 102 and/or client device 104 to request to perform a payment card action at ATM 16. In some embodiments, ATM computing device 102 and client device 104 may transmit payment card action request 506 to each other.

Upon determining the account holder and payment account are enrolled in the authentication service, ATM computing device and/or client device 104 are configured to generate authentication request 508 and transmit authentication request 508 to authentication computing device 106 to begin an authentication process for the requestor. Authentication request 508 includes a user or account identifier for identifying an authentication profile 504 associated with request 508. Authentication computing device 106 is configured to retrieve the associated authentication profile 504 to generate authentication challenge 510. In particular, authentication computing device 106 retrieves the authentication information from the enrollment process to determine a type of authentication (e.g., biometric, device, etc.) to request from the requestor. In some embodiments, such as when authentication challenge 510 is transmitted to client device 104, authentication computing device 106 retrieves a device identifier to communicate with the device associated with the account holder.

Authentication challenge 510 is transmitted to ATM computing device 102 and/or client device 104. Authentication challenge 510 is configured to prompt the requestor to provide similar authentication information as the authentication information provided during the enrollment process. ATM computing device 102 and/or client device 104 may include components or systems for collecting the requestor's authentication information (e.g., authentication component 112 and input component 114, respectively, shown in FIG. 2). Once authentication information has been collected by ATM computing device 102 and/or client device 104, authentication response 512 is generated and transmitted to authentication computing device 106. Authentication response 512 includes the collected authentication information from the requestor for comparison and analysis. In some embodiments, authentication response 512 further includes location data collected by client device 104 to facilitate identifying a location of the account holder relative to a plurality of ATMs, such as ATM 16.

In the example embodiment, authentication computing device 106 compares authentication profile 504 to authentication response 512. More specifically, authentication computing device 106 is configured to compare the stored authentication information from authentication profile 504 to the collected authentication information from authentication response 512. If the two sets of authentication information match or are within a predetermined threshold value of each other, the requestor may be the authentic account holder. If the two sets of authentication information do not match, the requestor may not be the account holder and, in some cases, may be attempting to perform a fraudulent payment card action through ATM 16.

Once the authentication information has been compared, authentication computing device 106 generates authentication result 514. Authentication result 514 indicates whether or not the identity of the requestor has been authenticated. In some embodiments, authentication result 514 includes an authentication value that indicates a confidence score of authentication computing device 106 that the requestor is the authentic account holder. Authentication computing device 106 may transmit authentication result 514 to ATM computing device 102, client device 104, and/or a different computing device, such as bank computing device 14 (shown in FIG. 1).

Figure 6:
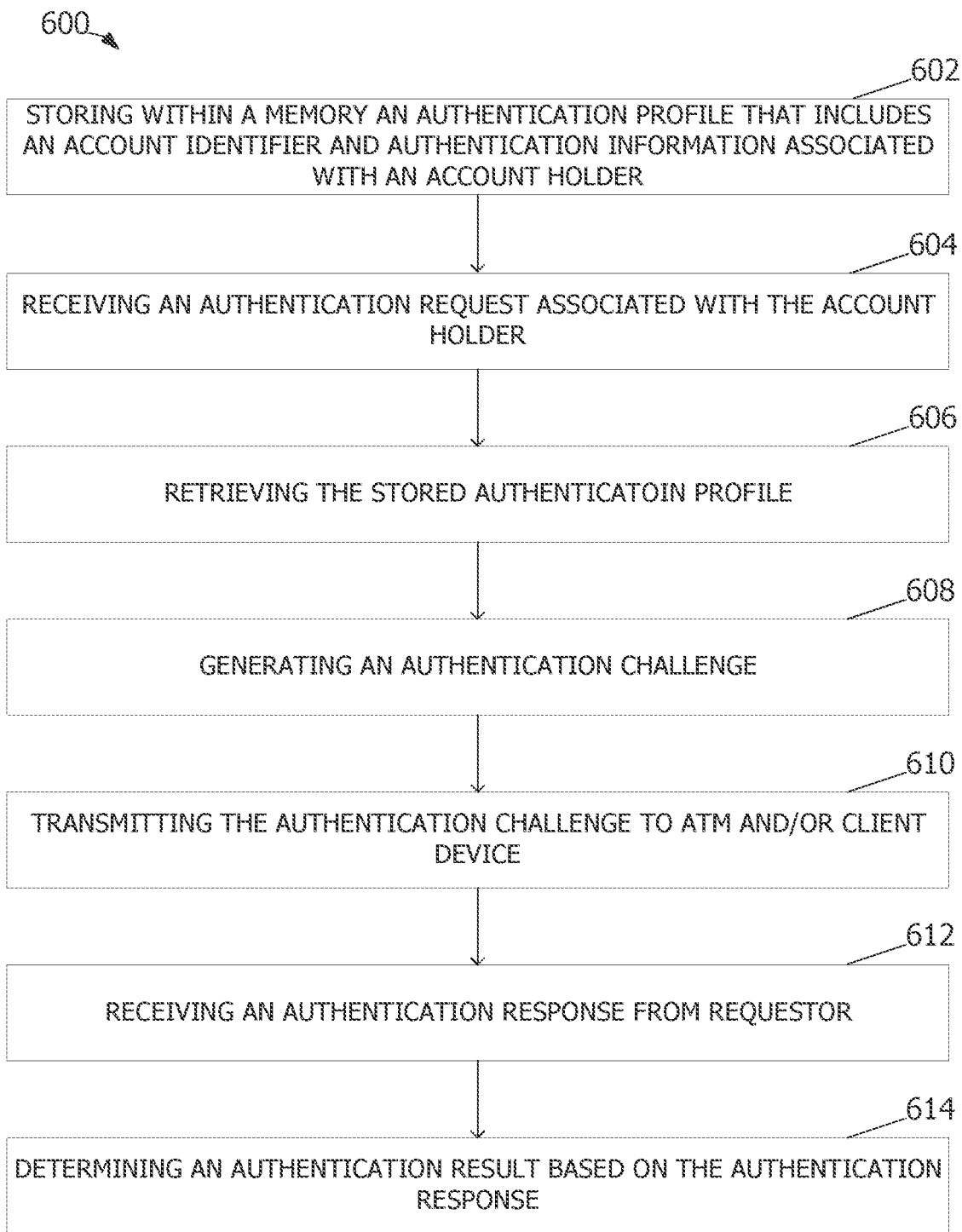
FIG. 6 is a flow diagram of an example method of authenticating a requestor for payment card actions at an ATM using the system shown in FIG. 2.

FIG. 6 is a diagram of an example method 600 for authenticating a request for a payment card action at an ATM using system 100 (shown in FIG. 2). In the example embodiment, method 600 is implemented by an authentication computing device. In some embodiments, method 600 may be at least partially performed by a different computing device, such as an ATM computing device. In other embodiments, method 600 may include additional, fewer, or alternative steps for authenticating a request, including those described elsewhere herein.

Method 600 begins with the authentication computing device storing 602 an authentication profile in a memory associated with the authentication computing device. The authentication profile includes account identifier and authentication information associated with a payment account and an account holder of the account. In at least some embodiments, the authentication computing device receiving the account identifier and the authentication information associated with the account holder. The authentication computing device generates the authentication profile associated with the account holder and the payment account based on the received account identifier and authentication information.

The authentication computing device receives 604 an authentication request associated with the payment account of the account holder. The authentication request is associated with a payment card action request from a requestor. The payment account request is submitted by the requestor to an ATM computing device or a client device to request a payment card action be performed through an ATM. The authentication computing device retrieves 606 the stored authentication profile for the payment account and generates 608 an authentication challenge based on the stored authentication profile. The authentication computing device transmits 610 the authentication challenge to the ATM and/or the client device. The authentication computing device receives 612 an authentication response from the requestor and determines 614 an authentication result based, at least in part, on the authentication response. The authentication result indicates if the requestor is the authenticated account holder of the payment account.

Figure 7:
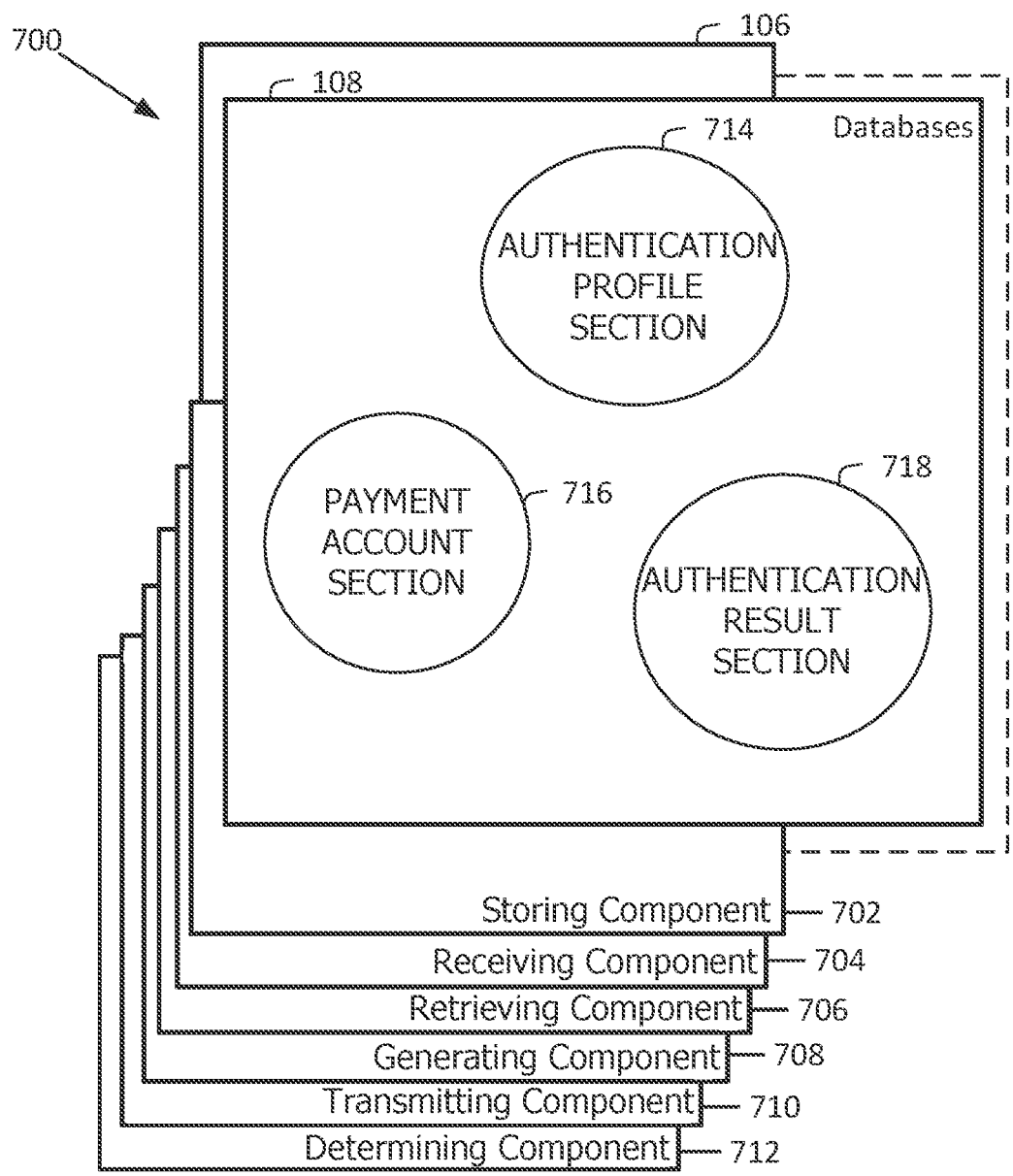
FIG. 7 is a diagram of components of one or more example computing devices that may be used in the environment shown in FIG. 6.

FIG. 7 is a diagram 700 of components of one or more example computing devices that may be used in the environment shown in FIG. 6. FIG. 7 further shows a configuration of databases including at least database 108 (shown in FIG. 2). Database 108 is coupled to several separate components within authentication computing device 106, which perform specific tasks.

Authentication computing device 106 includes a storing component 702 configured to store an authentication profile in a memory associated with authentication computing device 106 (e.g., database 108). Authentication computing device 106 includes a receiving component 704 configured to receive an authentication request and an authentication response. Authentication computing device 106 includes a retrieving component 706 configured to retrieve a stored authentication profile for a payment account. Authentication computing device 106 further includes a generating component 708 configured to generate an authentication challenge. Authentication computing device 106 additionally includes a transmitting component 710 configured to transmit an authentication challenge to a client device and/or an ATM computing device. Authentication computing device 106 further includes a determining component 712 configured to determine an authentication result based, at least in part, on an authentication response.

In an exemplary embodiment, database 108 is divided into a plurality of sections, including but not limited to, an authentication profile section 714, a payment account section 716, and an authentication result section 718. These sections within database 108 are interconnected to update and retrieve the information as required. Authentication profile section 714 may include, for example, authentication profiles of one or more account holders. Authentication profile section 714 may also include authentication information separate from the authentication profiles. Payment account section 716 may include account identifiers and/or user identifiers for identifying payment accounts and account holders that are enrolled in the authentication service. Authentication result section 718 may include authentication values and other information associated with each authentication request received by authentication computing device 106.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automated teller machine (ATM) configured to dispense payment cards, the ATM in communication with an authentication computing device configured to provide an authentication service for payment card actions at the ATM, the ATM including i) a dispensing mechanism configured to store a plurality of unregistered payment cards and ii) at least one processor in communication with a memory, the at least one processor configured to:
   receive, via a user interface of the ATM, from a requestor, a payment card action request for a payment card to be dispensed at the ATM, the payment card action request including information that identifies a payment account of an account holder;
   generate an authentication request associated with the payment account;
   transmit the authentication request to the authentication computing device to authenticate the requestor;
   receive, from the authentication computing device in response to the authentication request, an authentication challenge based on an authentication profile associated with the account holder stored at the authentication computing device;
   receive, via a biometric input component of the ATM in response to the authentication challenge, a biometric authentication response from the requestor;
   transmit, to the authentication computing device, the biometric authentication response;
   in response to receiving, from the authentication computing device, an authentication result indicating, based on the transmitted biometric authentication response, that the requestor is the account holder, cause the dispensing mechanism to physically add information corresponding to the identified payment account to a first payment card of the stored plurality of unregistered payment cards; and
   cause the dispensing mechanism to dispense the first payment card.

2. The ATM in accordance with claim 1, wherein the payment card action request is a request for a prepaid card, and wherein the at least one processor is further configured to determine that the payment account has sufficient funds to perform the payment card action request.

3. The ATM in accordance with claim 1, wherein the at least one processor is further configured to cause the dispensing mechanism to physically add personalization elements to the first payment card prior to dispensing the first payment card for the requestor.

4. The ATM in accordance with claim 1, wherein subsequent to processing the payment card action request, the at least one processor is further configured to transmit a notification to a client device associated with the account holder, the notification including information regarding the payment card action request performed at the ATM.

5. The ATM in accordance with claim 1, wherein the at least one processor is further configured to notify a bank computing device associated with the payment account that the first payment card has been dispensed.

6. The ATM in accordance with claim 1, wherein the biometric authentication response includes at least one of a fingerprint scan, an image, and a voiceprint of the requestor.

7. The ATM in accordance with claim 1, wherein prior to receiving the payment card action request, the at least one processor is further configured to:
   receive, via the user interface of the ATM, from the requestor, a user identifier associated with the payment account;
   retrieve account information associated with the payment account; and
   prompt the requestor to select an available payment card action.

8. The ATM in accordance with claim 1, wherein prior to generating the authentication request, the at least one processor is further configured to determine whether the payment account associated with the payment card action request is enrolled in the authentication service.

9. A computer-implemented method using an automated teller machine (ATM) configured to dispense payment cards, the ATM in communication with an authentication computing device configured to provide an authentication service for payment card actions at the ATM, the ATM including i) a dispensing mechanism configured to store a plurality of unregistered payment cards and ii) at least one processor in communication with a memory, said method comprising steps performed by the at least one processor of:
  receiving, via a user interface of the ATM, from a requestor, a payment card action request for a payment card to be dispensed at the ATM, the payment card action request including information that identifies a payment account of an account holder;
  generating, at the ATM, an authentication request associated with the payment account;
  transmitting the authentication request to the authentication computing device to authenticate the requestor;
  receiving, at the ATM, from the authentication computing device in response to the authentication request, an authentication challenge based on an authentication profile associated with the account holder stored at the authentication computing device;
  receiving, via a biometric input component of the ATM in response to the authentication challenge, a biometric authentication response from the requestor;
  transmitting, to the authentication computing device, the biometric authentication response;
  receiving, at the ATM, from the authentication computing device, an authentication result indicating, based on the transmitted biometric authentication response, that the requestor is the account holder;
  in response to receiving, at the ATM, the authentication result, causing the dispensing mechanism to physically add information corresponding to the identified payment account to a first payment card of the stored plurality of unregistered payment cards; and
  causing the dispensing mechanism to dispense the first payment card.

10. The computer-implemented method of claim 9, further comprising determining that the payment account has sufficient funds to perform the payment card action request.

11. The computer-implemented method of claim 9, further comprising causing the dispensing mechanism to physically add personalization elements to the first payment card prior to dispensing the first payment card for the requestor.

12. The computer-implemented method of claim 9, wherein subsequent to processing the payment card action request, the method further comprises transmitting, by the ATM, a notification to a client device associated with the account holder, the notification including information regarding the payment card action request performed at the ATM.

13. The computer-implemented method of claim 9, wherein the biometric authentication response includes at least one of a fingerprint scan, an image, and a voiceprint of the requestor.

14. The computer-implemented method of claim 9, wherein prior to receiving the payment card action request, the method further comprises:
  receiving, via the user interface of the ATM, from the requestor, a user identifier associated with the payment account;
  retrieving, by the ATM, account information associated with the payment account; and
  prompting the requestor to select an available payment card action.

15. The computer-implemented method of claim 9, wherein prior to generating the authentication request, the method further comprises determining, by the ATM, whether the payment account associated with the payment card action request is enrolled in the authentication service.

16. A non-transitory computer-readable storage media having computer-executable instructions embodied thereon, wherein when executed by an automated teller machine (ATM) configured to dispense payment cards, the ATM in communication with an authentication computing device configured to provide an authentication service for payment card actions at the ATM, the ATM including i) a dispensing mechanism configured to store a plurality of unregistered payment cards and ii) at least one processor in communication with a memory, the computer-readable instructions cause the ATM to:
  receive, via a user interface of the ATM, from a requestor, a payment card action request for a payment card to be dispensed at the ATM, the payment card action request including information that identifies a payment account of an account holder;
  generate an authentication request associated with the payment account;
  transmit the authentication request to the authentication computing device to authenticate the requestor;
  receive, from the authentication computing device in response to the authentication request, an authentication challenge based on an authentication profile associated with the account holder stored at the authentication computing device;
  receive, via a biometric input component of the ATM in response to the authentication challenge, a biometric authentication response from the requestor;
  transmit, to the authentication computing device, the biometric authentication response;
  receive, from the authentication computing device, an authentication result indicating, based on the transmitted biometric authentication response, that the requestor is the account holder;
  in response to receiving, from the authentication computing device, the authentication result, cause the dispensing mechanism to physically add information corresponding to the identified payment account to a first payment card of the stored plurality of unregistered payment cards; and
  cause the dispensing mechanism to dispense the first payment card.

17. The non-transitory computer-readable storage media of claim 16, wherein the computer-executable instructions further cause the ATM to determine that the payment account has sufficient funds to perform the payment card action request.

18. The non-transitory computer-readable storage media of claim 16, wherein the computer-executable instructions further cause the ATM to cause the dispensing mechanism to physically add personalization elements to the first payment card prior to dispensing the first payment card for the requestor.

19. The non-transitory computer-readable storage media of claim 16, wherein subsequent to processing the payment card action request, the computer-executable instructions further cause the ATM to transmit a notification to a client device associated with the account holder, the notification including information regarding the payment card action request performed at the ATM.

20. The non-transitory computer-readable storage media of claim 16, wherein the computer-executable instructions further cause the ATM to notify a bank computing device associated with the payment account that the payment card has been dispensed.

\* \* \* \* \*